(12) United States Patent
Johnston et al.

(10) Patent No.: US 11,623,587 B2
(45) Date of Patent: Apr. 11, 2023

(54) SYSTEM AND METHOD FOR MULTI-SHOT INJECTION MOLDED ROOF DITCH MOLDING WITH MULTIPLE COMPLEX CURVATURE

(71) Applicant: JAC Products, Inc., Saline, MI (US)

(72) Inventors: Ché C. Johnston, Macomb, MI (US); Gordon Michie, LaSalle (CA); David W. Blazic, Dearborn, MI (US)

(73) Assignee: JAC Products, Inc., Saline, MI (US)

( * ) Notice: Subject to any disclaimer, the term of this patent is extended or adjusted under 35 U.S.C. 154(b) by 264 days.

(21) Appl. No.: 16/987,686

(22) Filed: Aug. 7, 2020

(65) Prior Publication Data

US 2021/0039568 A1 Feb. 11, 2021

Related U.S. Application Data

(60) Provisional application No. 62/884,516, filed on Aug. 8, 2019.

(51) Int. Cl.
| | | |
|---|---|---|
| *B60R 13/04* | (2006.01) | |
| *B62D 25/07* | (2006.01) | |
| *B60R 9/058* | (2006.01) | |

(52) U.S. Cl.
CPC .............. *B60R 13/04* (2013.01); *B62D 25/07* (2013.01); *B60R 9/058* (2013.01)

(58) Field of Classification Search
CPC ........ B62D 25/06; B62D 25/07; B60R 9/058; B60R 13/04; B60R 13/06; B60R 13/07
See application file for complete search history.

(56) References Cited

U.S. PATENT DOCUMENTS

| | | | | |
|---|---|---|---|---|
| 4,930,279 A | * | 6/1990 | Bart ........................ | B60R 13/04 296/213 |
| 6,012,766 A | * | 1/2000 | Myles ..................... | B60R 9/045 296/213 |

(Continued)

FOREIGN PATENT DOCUMENTS

| | | |
|---|---|---|
| DE | 9401563 U1 | 3/1994 |
| DE | 202013104713 U1 | 10/2013 |

(Continued)

OTHER PUBLICATIONS

Extended European Search Report regarding European Application No. 20190014.9, dated Apr. 20, 2021.

*Primary Examiner* — Gregory A Blankenship
(74) *Attorney, Agent, or Firm* — Harness, Dickey & Pierce, P.L.C.

(57) ABSTRACT

The present disclosure relates to a roof ditch molding for mounting in a roof ditch of a roof of a motor vehicle. The roof ditch molding may have a first portion and a second portion. The first portion is made from a molding process using a first material. The first material imparts a rigid characteristic to the first portion. The first portion is further configured to at least substantially cover a major portion of a roof ditch of a vehicle roof, and to closely follow at least one contour of the roof ditch. The second portion is made from the molding process using a second material. The second material imparts a flexible characteristic to the second portion and is integrally connected to the first portion such that the second portion projects laterally outwardly of the first portion while following a contour of the first portion. The second portion provides a compliant seal/transition area between the first portion and the roof ditch.

15 Claims, 5 Drawing Sheets

(56) References Cited

U.S. PATENT DOCUMENTS

| | | | | |
|---|---|---|---|---|
| 7,029,060 B1* | 4/2006 | Osterberg | | B60R 13/04 |
| | | | | 296/210 |
| 8,657,370 B1* | 2/2014 | Pierce | | B60R 13/06 |
| | | | | 296/213 |
| 10,071,522 B2* | 9/2018 | Porter | | B60R 13/04 |
| 2005/0011158 A1* | 1/2005 | Mikkaichi | | B60R 13/04 |
| | | | | 52/716.1 |
| 2009/0021053 A1* | 1/2009 | Harberts | | B60R 13/04 |
| | | | | 296/213 |
| 2009/0051183 A1 | 2/2009 | Mourou et al. | | |
| 2009/0102241 A1* | 4/2009 | Harberts | | B60R 13/04 |
| | | | | 296/213 |
| 2013/0234461 A1* | 9/2013 | Coakley | | B60R 13/04 |
| | | | | 296/213 |
| 2014/0062117 A1* | 3/2014 | Baxter | | B29C 48/0022 |
| | | | | 296/1.08 |
| 2015/0128522 A1* | 5/2015 | Taki | | B60J 1/006 |
| | | | | 52/716.5 |
| 2015/0210228 A1* | 7/2015 | Bach | | B60R 13/04 |
| | | | | 296/213 |
| 2019/0016276 A1* | 1/2019 | Karmo | | B62D 25/06 |
| 2019/0071031 A1* | 3/2019 | Sharron | | B60R 13/04 |
| 2019/0232890 A1* | 8/2019 | Nydam | | B60R 13/06 |
| 2019/0241131 A1* | 8/2019 | Wittmann | | B60R 13/06 |
| 2020/0094878 A1* | 3/2020 | Tomita | | B62D 25/02 |
| 2020/0276940 A1* | 9/2020 | Shriver | | B62D 25/07 |
| 2021/0039568 A1* | 2/2021 | Johnston | | B60R 13/04 |
| 2021/0362662 A1* | 11/2021 | Wittmann | | B60R 13/04 |
| 2022/0072754 A1* | 3/2022 | Brown | | B29C 48/21 |

FOREIGN PATENT DOCUMENTS

| | | |
|---|---|---|
| DE | 102013222606 A1 | 5/2014 |
| EP | 1319578 A2 | 6/2003 |

* cited by examiner

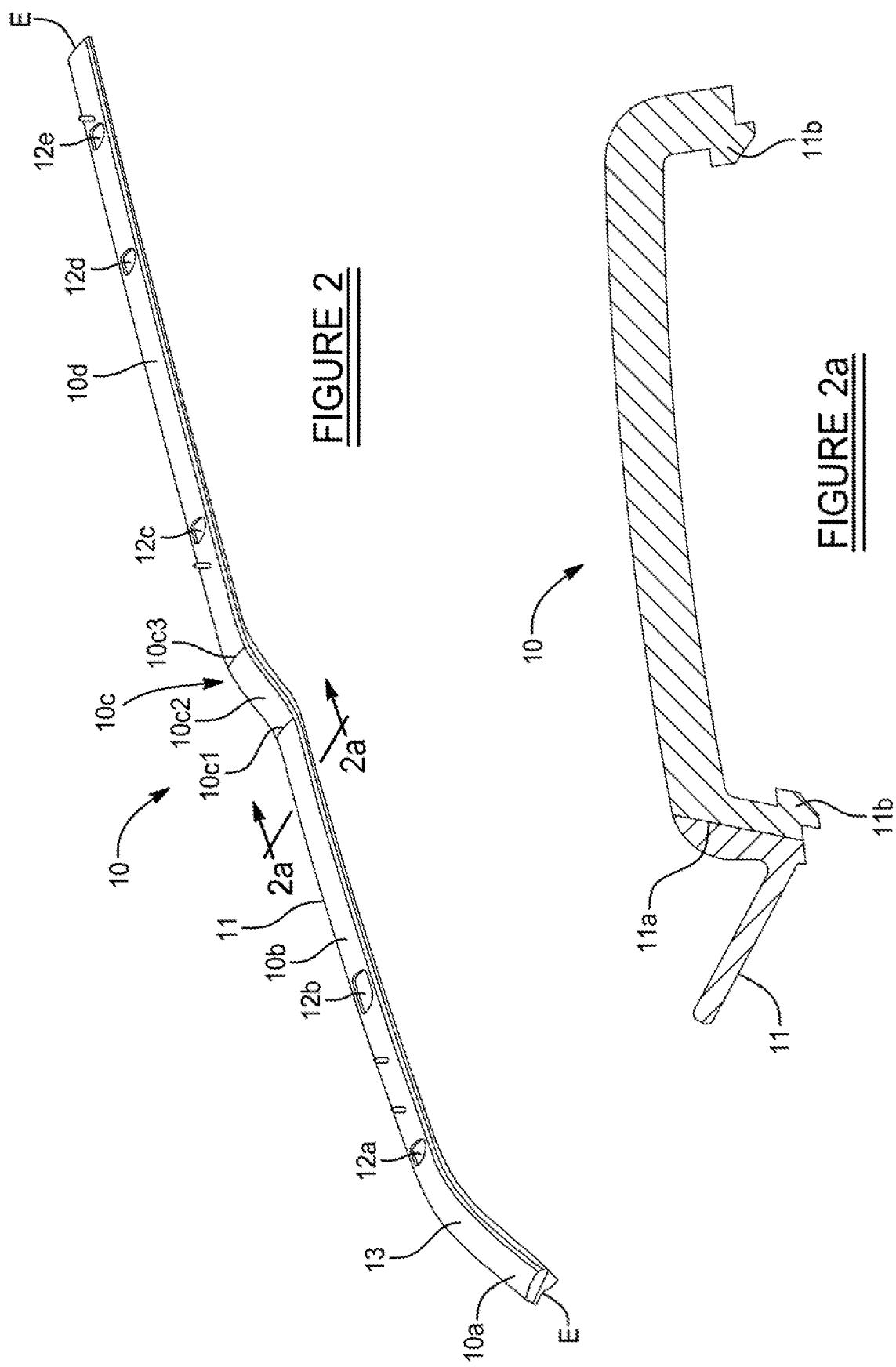

SYSTEM AND METHOD FOR MULTI-SHOT INJECTION MOLDED ROOF DITCH MOLDING WITH MULTIPLE COMPLEX CURVATURE

CROSS-REFERENCE TO RELATED APPLICATIONS

This application claims the benefit of U.S. Provisional Application No. 62/884,516, filed on Aug. 8, 2019. The entire disclosure of the above application is incorporated herein by reference.

FIELD

The present disclosure relates to roof ditch moldings for covering a roof ditch area on a vehicle roof, and more particularly to a complexly shaped, multi-shot, injection-molded roof ditch molding which can be formed entirely from a multi-shot injection molding process, and a method for making same.

BACKGROUND

The statements in this section merely provide background information related to the present disclosure and may not constitute prior art.

Roof ditch moldings have typically been used to cover the roof ditches on the roofs of motor vehicles such as sedans, vans, mini-vans, light pickup trucks, etc. The roof ditch molding is used to close off the roof ditch section of a vehicle roof, which is where the roof panel is welded to the body side panel, which produces a generally unsightly trough or "ditch" along substantially the full length of the vehicle roof. The roof ditch area also helps with water management by trapping and channeling water landing on the roof during a rainstorm into the ditch rail area. This prevents the water from simply running off the sides of the vehicles and onto occupants entering or leaving the vehicle.

Typically roof ditch moldings have been made in an expensive, cumbersome, multi-step process. The process typically begins with roll forming and co-extruding straight sections of metal stock and PVC. The metal used is typically aluminum or stainless steel. The metal and PVC are roll-formed and co-extruded to create a flat, elongated component having a compliant PVC lip along one edge. The compliant PVC lip helps to form an interference fit along one longitudinal edge of the roof ditch, and to thus fully or partially cover the roof ditch. An important feature of the PVC lip is that its compliance enables accommodating sheet metal variations in the roof ditch. The metal stock within roof ditch molding can be used to engage with one or more roof ditch clips that are mounted in the roof ditch, which securely affixes the roof ditch molding in the roof ditch. The finished roof ditch molding may have a textured surface and is sometimes painted to match the color of the vehicle body. A typical roll-formed/co-extruded/stretch-formed roof ditch molding is shown in FIG. 1.

Next the initial roll forming and extrusion, which produces a straight, flat, elongated component, the component is cut to a desired overall length. Of course, this creates a certain amount of scrap. The cut-to-length straight, flat, elongated component is then stretch formed using a separate tool to impart a desired overall curvature to the component. This is needed because the vehicle roof ditch typically has a small degree of curvature over its full length (i.e., from the front of the vehicle roof to the back of the vehicle roof). Next, scrap material is removed from the opposing ends of the component. Next, portions of the component are notched and hardware and end caps are attached (i.e., staking). Finally, any other clips, tapes or sealing foams are applied to the component, and then the finished component is packaged for shipping to a vehicle assembly plant where it is installed on a vehicle roof. As will be appreciated, the above-described manufacturing operation is very labor intensive.

An additional limitation with roof ditch moldings made with the conventional roll-forming/co-extrusion/stretch-forming process described above is their limitation to roofs which have a single curvature, or possibly just slight curvatures at the opposing ends. Furthermore, with present day construction techniques, the extrusion operation limits the roof ditch molding to being made with a constant cross-sectional shape and dimensions. Thus, the cross-sectional shape, and the overall cross-sectional profile of the roof ditch molding cannot be controllably varied over the full length of the roof ditch molding. For example, it is not possible to make the leading edge of the roof ditch molding wider than the trailing edge; such is just not possible when using a rollform/extrusion operation to make the part. This limits both the functional and aesthetic features that can be integrated into the roof ditch molding.

Still further, many newer SUV vehicles being produced at the present time have what is known as a "Safari" style roof. The Safari style roof is a roof that has gradual "step" up at an intermediate point of the roof. This enables a greater degree of headroom in the rear seats of the vehicle, as well as imparting a stylistic element to the roof of the vehicle. Producing a roof ditch rail that can be used with a Safari style roof is especially challenging with conventional stretch forming and extrusion manufacturing techniques. This is part because the outermost ends of the roof ditch rail will typically have a curvature that curves in a first direction, but the "step" portion that needs to follow the contour of the Safari roof "step", at the leading side of the step, will need a curvature which is opposite to that used at the ends of the rail. The traditional stretch forming process is ill suited to forming a molded roof ditch rail with multiple, differing curvatures along its length.

Accordingly, what is needed is a roof ditch molding and method of making same that is suited to making roof ditch moldings in a simpler, faster, more cost effective process, and which produce roof ditch moldings that are not limited in having a constant cross sectional profile over their full length, and which are especially well suited to being used with complex roof shapes having two or more distinct curvatures which help to form the roof, and in one specific example with Safari style vehicle roofs.

SUMMARY

This section provides a general summary of the disclosure, and is not a comprehensive disclosure of its full scope or all of its features.

In one aspect the present disclosure relates to a roof ditch molding for mounting in a roof ditch of a roof of a motor vehicle. The roof ditch molding may comprise a first portion and a second portion. The first portion is made from a molding process using a first material. The first material imparts a rigid characteristic to the first portion. The first portion is further configured to at least substantially cover a major portion of a roof ditch of a vehicle roof, and to closely follow at least one contour of the roof ditch. The second portion is made from the molding process using a second material. The second material imparts a flexible characteristic to the second portion and is integrally connected to the first portion such that the second portion projects laterally outwardly of the first portion while following a contour of the first portion. The second portion provides a compliant seal/transition area between the first portion and the roof ditch.

In another aspect the present disclosure relates to a roof ditch molding for mounting in a roof ditch of a roof of a motor vehicle. The roof ditch molding may comprise a first portion and a second portion. The first portion may be made from a molding process using a first material. The first material imparts a rigid characteristic to the first portion and the first portion is further configured to at least substantially cover a major portion of a roof ditch of a vehicle roof, and to closely follow at least one contour of the roof ditch. The second portion is made from the molding process using a second material. The second material imparts a flexible characteristic to the second portion and being integrally connected to the first portion such that the second portion projects laterally outwardly of a longitudinal edge of the first portion while following a contour of the first portion. The second portion provides a compliant seal/transition area between the first portion and the roof ditch. The first and second portions have the same contour and cooperatively form a complexly shaped component having at least one curving portion and at least a pair of linear sections on opposite sides of the curving portion.

In still another aspect the present disclosure relates to a method for forming a roof ditch molding for mounting in a roof ditch of a roof of a motor vehicle. The method may comprise using a molding process to form a first portion of the roof ditch molding using a first material, the first material imparting a rigid characteristic to the first portion and the first portion further configured to at least substantially cover a major portion of a roof ditch of a vehicle roof to which the roof ditch molding is to be secured, and to closely follow at least one contour of the roof ditch. The method may further include using the molding process to also form a second portion of the roof ditch molding using a second material. The second material imparts a flexible characteristic to the second portion and is integrally connected to the first portion such that the second portion forms a compliant strip projecting laterally outwardly of a longitudinal edge of the first portion, while following a contour of the first portion, and provides a compliant seal/transition area between the first portion and the roof ditch.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings, in which:

FIG. 2 is a perspective view of one example of a two-shot injection molded roof ditch molding made in accordance with the present disclosure, which is intended for use on a vehicle with a Safari style roof;

FIG. 2a is a cross sectional side view of the roof ditch molding of FIG. 2 taken along section line 2a-2a in FIG. 2;

DETAILED DESCRIPTION

Figure 1:
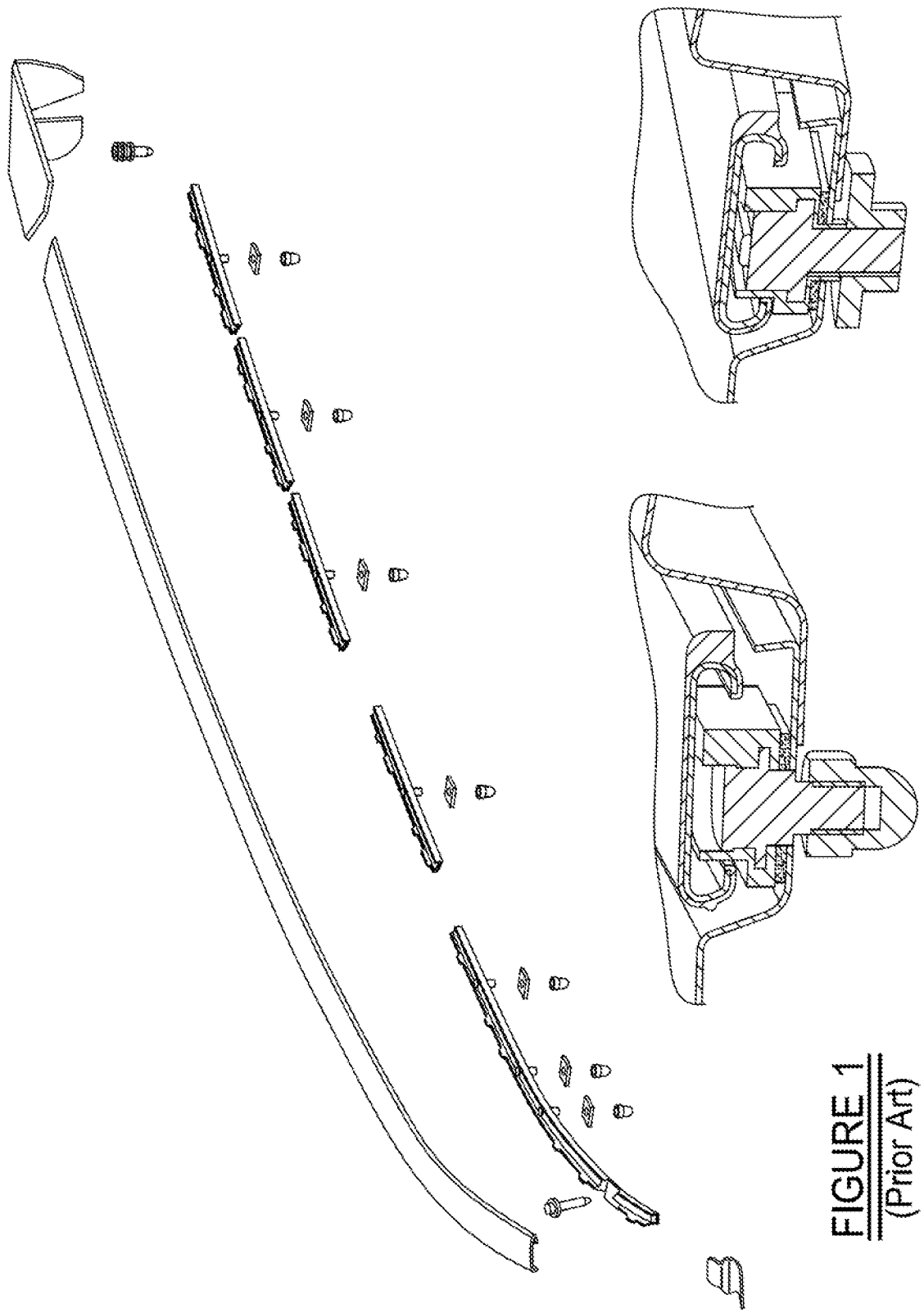
FIG. 1 is a perspective view of a prior art roof ditch rail formed in accordance with a prior art roll forming/extrusion/stretch forming operation.

Example embodiments will now be described more fully with reference to the accompanying drawings.

Referring to FIG. 2 there is shown a complexly shaped roof ditch molding 10 in accordance with one embodiment of the present disclosure. The roof ditch molding 10 in this example includes a first portion 10a having a first degree of curvature, a second section 10b which in this example has a very slight degree of curvature, a third or "step" portion 10c, and a generally linear section 10d. And while the roof ditch molding 10 in this example has a constant cross-sectional profile, a significant benefit of the present disclosure is that the manufacturing process disclosed herein enables the roof ditch molding to be created with a varying cross-sectional profile/shape over its length. This feature will be discussed further in the following paragraphs.

Figure 2B:
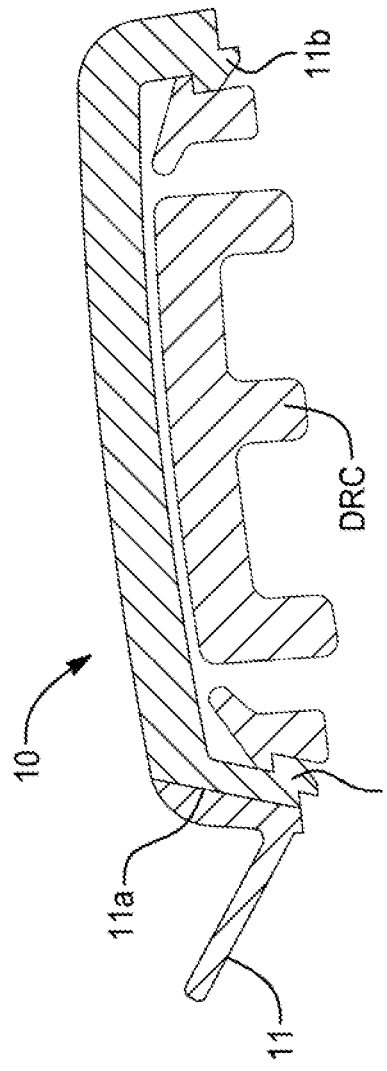
FIG. 2b is a cross sectional view of the roof ditch molding secured to an ditch clip, illustrating how outer peripheral ledges of the roof ditch molding engage the ditch clip.

The roof ditch molding 10 also includes an integrally formed compliant strip 11, shown more clearly in FIG. 2a, which extends along a full length of one side of the roof ditch molding 10, and which projects laterally outwardly of the roof ditch molding 10 typically a few millimeters, to help provide a compliant seal/transition between the molding 10 and the roof ditch when the roof ditch molding is secured in the roof ditch. In this regard it will be appreciated that the roof ditch molding 10 is primarily formed from a hard, generally rigid plastic material, such as for example TPO (thermoplastic polyolefin), polypropylene and glass, or any other suitably rigid plastic material. The compliant strip 11, however, is formed from a different, typically "softer" material, typically TPV (thermoplastic vulcanizates) or TPE (thermoplastic elastomers), using a multi-shot molding process. This produces a durable, chemical bond at an interface 11a where the plastic material of the compliant strip 11 meets and joins with the plastic material used to form the major portion of the roof ditch molding 10. A pair of retention tabs 11b, as shown in FIGS. 2a and 2b, may also be integrally formed on the roof ditch molding 10. The retention tabs 11b may clip on to a ditch rail clip "DRC" shown in FIG. 2b, which itself would be secured in the ditch rail. This enables the roof ditch molding 10 to be secured in the ditch rail using a quick, simple, press fit attachment process.

The construction of the roof ditch molding 10 is not limited to the use of only the above mentioned plastics, only that the plastic used for the major portion of the roof ditch molding helps to form a rigid structure, while the plastic used for the compliant strip 11 enables the needed degree of flexibility/compliance for the compliant strip to perform its function in conforming to minor variations in the dimensions of the roof ditch and providing a clean sealing line in the roof ditch. The clean sealing line is important so that the roof ditch molding 10 does not detract in any way from the aesthetics of the vehicle on which it is being used.

The roof ditch molding 10 in this example also advantageously includes end caps "E" integrally formed at the leading and trailing ends thereof. This eliminates the possibility of ever having one of the end clips become detached and eliminates a manual assembly step of having to separately attach the end caps.

Figure 5:
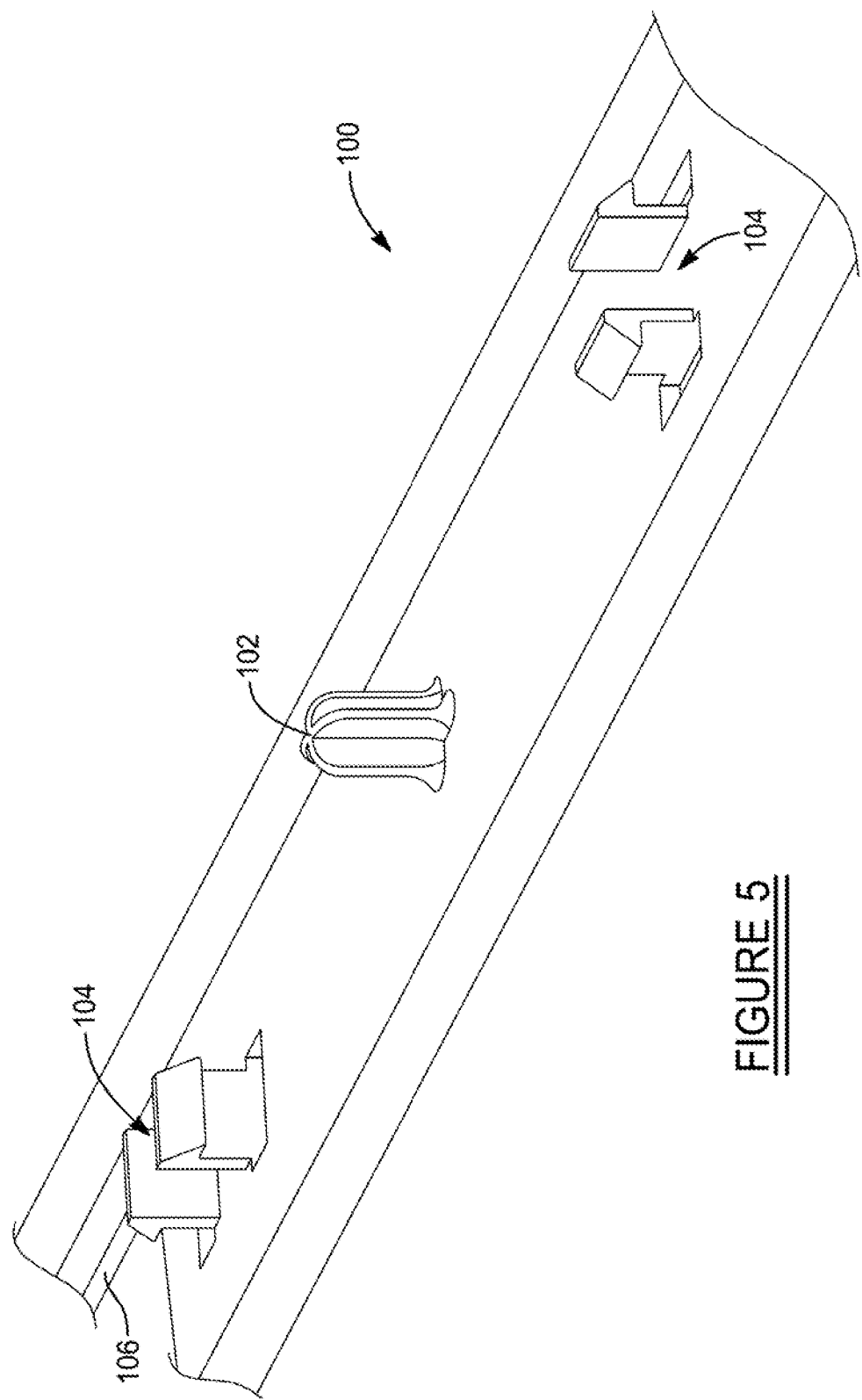
FIG. 5 shows a portion of a roof ditch molding in accordance with another embodiment of the present disclosure, illustrating how additional attachment and locating features can be easily designed into, and incorporated on, the roof ditch molding.

The roof ditch molding 10 may also include, but does not absolutely have to incorporate, molded-in locators for positioning of the roof ditch molding 10, and/or molded-in locators for addressing up/down Z axis constraints at the ends of the molding, and/or for enabling attachment of other components associated with other components, such as a vehicle roof rack, to the roof ditch molding 10. FIG. 5 illustrates a portion of a roof ditch molding 100 in accordance with another embodiment of the present disclosure showing a projecting locator feature 102 and a pair of attachment clips 104 that may be integrally formed in the ditch rail molding. One or more openings 106 may also be formed in the roof ditch molding 100 to enable other components (i.e., components associated with a roof rack) to pass through the roof ditch molding once it is assembled in the roof ditch. Virtually any type of fastening and/or locating implement may potentially be incorporated into the roof ditch molding 10 during its manufacture. Such fastening and/or locating implements may form projections, cavities or recesses, or any combination of such features, at one or more strategic locations along the roof ditch molding 10, which help to secure the roof ditch molding in the roof ditch, or which help to secure other components to the roof ditch molding.

The step portion 10c shown in FIG. 2 is formed by curvature 10c1, short linear portion 10c2 and curvature 10c3. Overall, the roof ditch molding 10 forms a complexly shaped component because of its combination of curved and linear sections, and because of the curvatures 10c1 and 10c3, which need to be formed in the opposite manner of the curvature that connects the first and second portions 10a and 10b, that curvature being identified with reference number 13 in FIG. 2. Forming multiple, distinct curved sections of a ditch rail molding with the conventional roll forming/co-extrusion, stretch-forming process described above is especially difficult, if not impossible to carry out reliably and consistently. And when forming a part such as a roof ditch molding, which typically has somewhat of a C-shaped configuration in profile, an additional problem one must address is the tendency of the depending legs of the C-shaped configuration to want to "flare out" or "splay out" at the bend points, which can undesirably change the overall cross-sectional dimensions of the roof ditch molding in a way which prevents the desired fit in the roof ditch.

Just as one specific example, the roof ditch molding 10 is ideally suited for use with a Safari style roof because of its step portion 10c. In this example, the roof ditch molding 10 also includes a plurality of cutout portions 12a-12e which enable portions of a roof rack to pass through the roof ditch molding 10 to be secured directly to studs or other like elements integrated into the roof ditch of the vehicle roof. Advantageously, the cutout portions 12a-12e can be formed during the multi-shot molding process so that no separate machining operations are required to produce them (and thus no scrap material is created as well).

Portion 10a would be positioned adjacent a front or leading edge of the vehicle roof (adjacent the windshield), while portion 10d would end near the rear of the vehicle roof. Optionally, still another slightly curved portion could be added at the terminal end of portion 10d to curve downwardly slightly, if the vehicle roof had a roof ditch that sloped downwardly slightly at the rear edge of the vehicle roof. Those skilled in this art will appreciate that the number and orientation of the curves of the roof ditch molding 10 will be dictated primarily by the vehicle roof contour. As such, the roof ditch molding 10 could be readily designed to incorporate greater or fewer than the three curvatures 13, 10c1 and 10c3 shown in the figures. Still further the radius of curvature of the curvatures used to form the roof ditch molding 10 can be varied as needed to conform to the contour of virtually any shape of vehicle roof.

Figure 3:
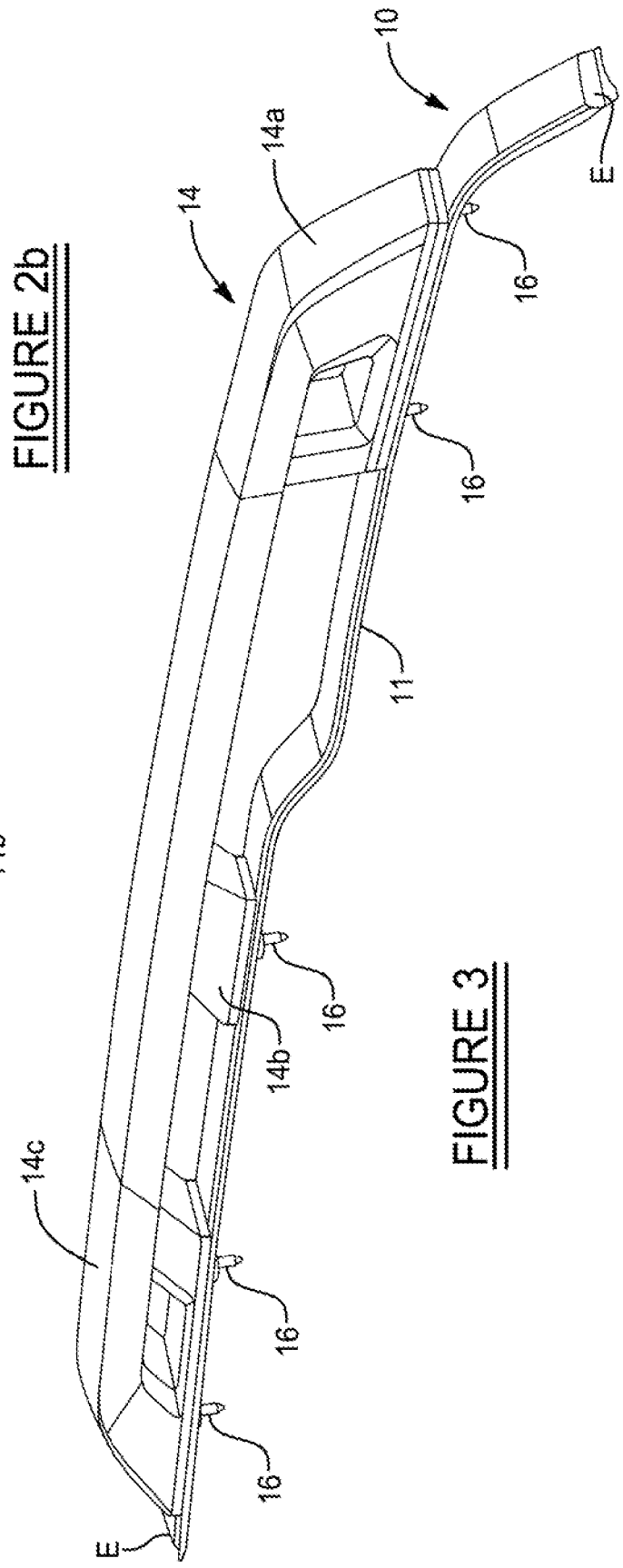
FIG. 3 shows an example of the roof ditch molding of FIG. 2 which includes features incorporated into the roof ditch molding during its manufacture to enable it to be coupled to components of a roof rack support rail assembly.

FIG. 3 shows the roof ditch molding 10 integrated with a roof rack support rail 14 to form a single integrated assembly that can be shipped, handled and secured to a vehicle roof as one complete subassembly. In this example the roof ditch molding 10 further may include a plurality of clips or studs 16 that are formed as separate attachment elements, and which are secured to the roof ditch molding 10. The studs 16 enable the entire subassembly of roof ditch molding 10 and support rail 14 to be secured in one operation to the vehicle roof. Portions of the studs 16 may be secured to structure at forward, center and rearward end support portions 14a, 14b, and 14c, respectively, of the support rail 14 prior to installing the subassembly of components 10 and 14 on the vehicle roof.

Figure 4:
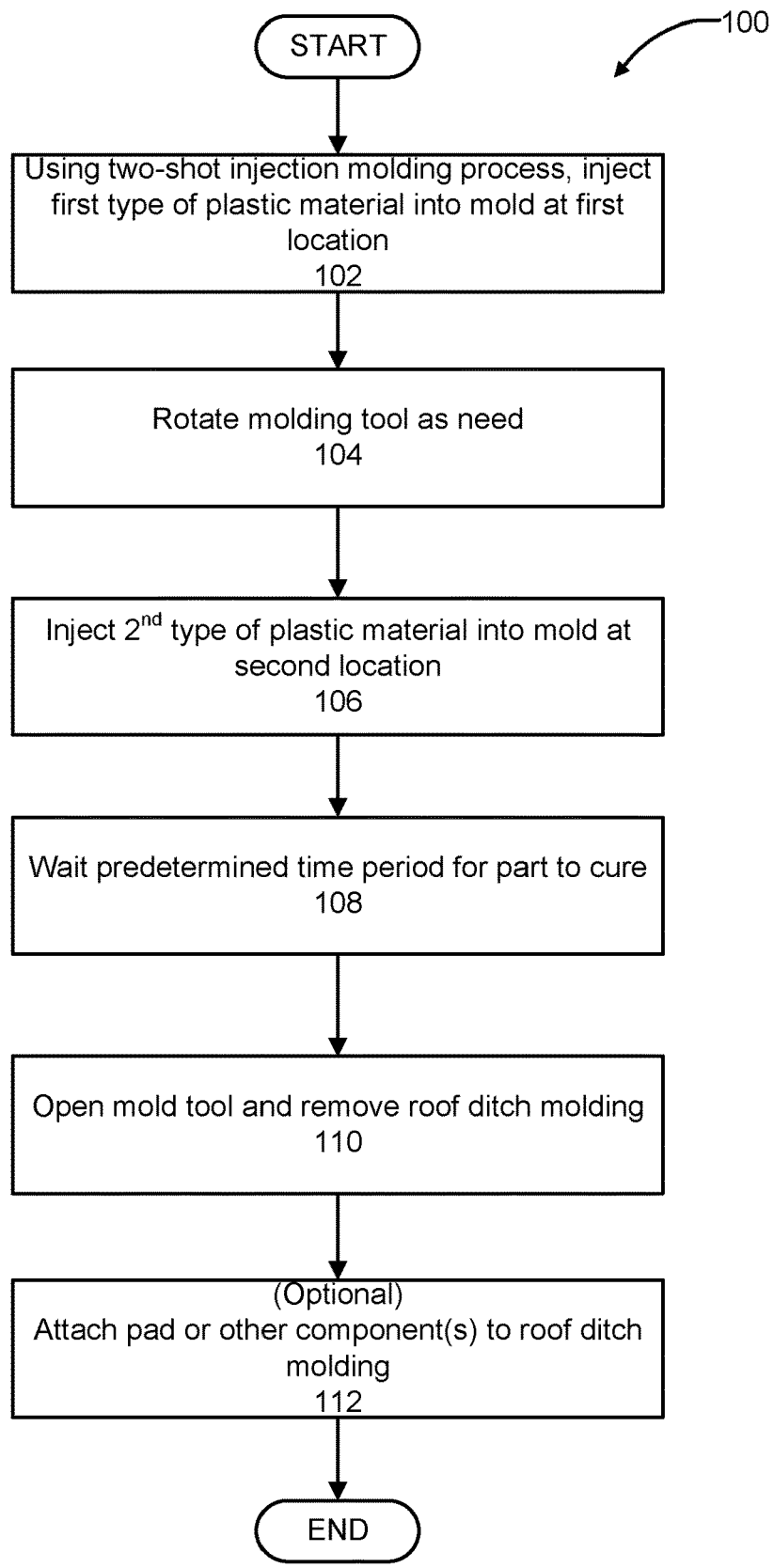
FIG. 4 shows a high level flowchart of operations that may be used to form the roof ditch molding of the present disclosure.

FIG. 4 shows a high level flowchart 100 detailing a process for forming the roof ditch molding 10. At operation 102 a multi-shot molding process is used to begin creating the roof ditch molding 10 by injecting a first plastic material (e.g., TPO or Polypropylene with glass fill) at a first location of a molding tool. This will form the majority of the roof ditch molding 10 (i.e., everything except the compliant strip 11). At operation 104 the molding tool is rotated as needed to present a different portion of the tool into which a second type of plastic material may be injected. The second type of material may be TPV or TPE, or possibly even a different yet suitable plastic which will produce a compliant characteristic for the compliant strip 11. In this example the "different portion" is the lateral edge where the resilient strip 11 will be formed. The degree of rotation used in this example is 180 degrees, but a greater or lesser degree of rotation could be used depending on how molding tool is constructed. The rotation of the molding tool is accomplished typically within a second or two.

At operation 106 the second material is injected into the second location of the molding tool which will form a chemical bond with the first material at the interface line 11a shown in FIG. 2a. Then a short time interval, for example 5 seconds-6 seconds, is provided for the part to cure, as indicated at operation 108. At operation 110 the molding tool may be opened and the cured roof ditch molding 10 can be ejected. At operation 112, any optional components (e.g., foam pads, clip attachment elements, studs, etc.) may be secured to the roof ditch molding 10, or any other optional processing operations may be performed.

While the above-described method has been explained in one specific example as being used to produce a roof ditch molding for use with a Safari style roof, it will be appreciated that the teachings herein could be used to make roof ditch rails having other complexly curved shapes, as well as varying cross-sectional profiles, to suit the requirements of virtually any roof contour and any roof ditch channel. The roof ditch molding 10 can be constructed using the teachings explained herein to meet virtually any roof contour need or requirement, and particularly to make a multiple curvatures which would simply not be possible with conventional roll forming/co-extrusion/stretch-forming processes. Still further, it will be appreciated that the teachings provided herein may be used to make other complexly shaped vehicle trip components from two or more plastics. Parts having 2, 3, 4 or more distinct curvatures, made from two or more different materials, and/or with varying cross-sectional shapes or profiles, may be constructed using the manufacturing process described herein to make a wide variety of vehicle components. As such, the present disclosure is not limited to using only two different plastic materials in a multi-shot injection molding operation, and is not limited to making only roof ditch moldings, or to roof ditch molding with a constant cross-sectional shape or profile.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A roof ditch molding for mounting in a roof ditch of a roof of a motor vehicle, the roof ditch molding comprising:
    a first portion made from a molding process using a first material, the first material imparting a rigid characteristic to the first portion and the first portion further configured to at least substantially cover a major portion of a roof ditch of a vehicle roof, and to closely follow a plurality of contours of the roof ditch;
    a second portion made from the molding process using a second material, the second material imparting a flexible characteristic to the second portion and being integrally connected to the first portion such that the second portion projects laterally outwardly of the first portion while following a contour of the first portion, and provides a compliant seal/transition area between the first portion and the roof ditch; and
    wherein the first portion and the second portion form a complexly curving roof ditch component having at least two curved sections and more than one linear section, and where the curved sections are formed to curve in the opposite manner along a longitudinal axis of the roof ditch molding.

2. The roof ditch molding of claim 1, wherein the second portion forms a compliant strip projecting laterally outwardly from the first portion along a full length of the first portion.

3. The roof ditch molding of claim 1, wherein the first portion is formed from a rigid plastic material.

4. The roof ditch molding of claim 3, wherein the rigid plastic material comprises a thermoplastic polyolefin.

5. The roof ditch molding of claim 3, wherein the rigid plastic material comprises a polypropylene and glass.

6. The roof ditch molding of claim 1, wherein the second portion is formed from a thermoplastic vulcanizate.

7. The roof ditch molding of claim 1, wherein the second portion is formed from a thermoplastic elastomer.

8. The roof ditch molding of claim 1, wherein the first portion includes at least one integrally formed, outwardly projecting retention tab for assisting in securing the first portion in the roof ditch to an external ditch rail clip mounted in the roof ditch prior to installation of the roof ditch molding.

9. The roof ditch molding of claim 1, wherein the first portion includes at least one projecting locator integrally formed with the first portion for assisting in positioning the first portion during assembly in the roof ditch.

10. The roof ditch molding of claim 1, wherein the first portion includes at least one opening integrally formed therein during the molding process to enable an external component being supported and attached to the roof to be secured to external structure in the roof ditch.

11. A roof ditch molding for mounting in a roof ditch of a roof of a motor vehicle, the roof ditch molding comprising:
a first portion made from a molding process using a first material, the first material imparting a rigid characteristic to the first portion and the first portion further configured to at least substantially cover a major portion of a roof ditch of a vehicle roof, and to closely follow a plurality of contours of the roof ditch; and
a second portion made from the molding process using a second material, the second material imparting a flexible characteristic to the second portion and being integrally connected to the first portion such that the second portion projects laterally outwardly of a longitudinal edge of the first portion while following the plurality of contours of the first portion, and provides a compliant seal/transition area between the first portion and the roof ditch; and
wherein the first and second portions have the same contour and cooperatively form a complexly shaped component having at least two curving portions and at least a pair of linear sections on opposite sides of the curving portions, and where the two curving portions curve in opposite directions along a longitudinal axis of the roof ditch molding; and
wherein the linear sections include a plurality of openings for enable securing of the roof ditch molding to the roof ditch of the motor vehicle.

12. The roof ditch molding of claim 11, wherein the second portion extends a full length of the first portion.

13. The roof ditch molding of claim 11, wherein the first portion comprises at least one of:
a thermoplastic polyolefin; or
a polypropylene and glass.

14. The roof ditch molding of claim 11, wherein the first portion further comprises at least one of a clip or a stud for enabling attachment of an external roof rack support rail thereto.

15. A method for forming a roof ditch molding for mounting in a roof ditch of a roof of a motor vehicle, the method comprising:
using a molding process to form a first portion of the roof ditch molding using a first material, the first material imparting a rigid characteristic to the first portion and the first portion further configured to at least substantially cover a major portion of a roof ditch of a vehicle roof to which the roof ditch molding is to be secured, and to closely follow a plurality of curving sections and a plurality of linear sections of the roof ditch;
using the molding process to also form a second portion of the roof ditch molding using a second material, the second material imparting a flexible characteristic to the second portion and being integrally connected to the first portion such that the second portion forms a compliant strip projecting laterally outwardly of a longitudinal edge of the first portion while following the curving and the linear sections of the first portion, and provides a compliant seal/transition area between the first portion and the roof ditch; and
wherein the roof ditch molding forms a complexly shaped roof ditch molding, and where the curving sections curve in an opposite manner relative to one another along a longitudinal axis of the roof ditch molding.

* * * * *